United States Patent [19]

Eguchi

[11] Patent Number: 5,375,954
[45] Date of Patent: Dec. 27, 1994

[54] CLIP FASTENER

[75] Inventor: Tomoo Eguchi, Utsunomiya, Japan

[73] Assignee: Nifco Inc., Yokohama, Japan

[21] Appl. No.: 153,965

[22] Filed: Nov. 18, 1993

[30] Foreign Application Priority Data

Nov. 19, 1992 [JP] Japan .................... 4-85459[U]

[51] Int. Cl.⁵ .................................... F16B 13/06
[52] U.S. Cl. .................................. 411/48; 411/41;
411/60; 411/908
[58] Field of Search ............... 411/41, 45, 46, 48,
411/60, 908, 62

[56] References Cited

U.S. PATENT DOCUMENTS

| 4,840,523 | 6/1989 | Oshida | 411/48 |
| 4,952,106 | 8/1990 | Kubogochi et al. | 411/60 X |
| 5,085,545 | 2/1992 | Takahashi | 411/45 |

FOREIGN PATENT DOCUMENTS 61-166212 10/1986 Japan .

Primary Examiner—Neill R. Wilson
Attorney, Agent, or Firm—Oblon, Spivak, McClelland, Maier & Neustadt

[57] ABSTRACT

A clip comprising a female member and a male member, with the female member having a plurality of resilient divisions, with the end of each division pressing radially inwardly, and in which the male member has a head portion that radially outwardly flexes said divisions, a small diameter portion integrally associated to the rear of the head portion that does not radially outwardly flex the divisions, and a large diameter portion integrally associated to the rear of the small diameter portion that can engage with the ends of the divisions to thereby hold the divisions in a radially outwardly flexed state, and the small diameter portion is also provided with ribs which can be received in the dividing slits used to form the divisions in the female member. As the insertion of the head portion proceeds, a cam surface on a cutaway portion formed on the head portion enables the projections of the divisions to be guided into position on the side of the ribs, whereby the ribs can be located in the slits by slightly rotating the male or female member.

2 Claims, 2 Drawing Sheets 5,375,954

CLIP FASTENER

BACKGROUND OF THE INVENTION

1. Field of the Invention

The present invention relates to a clip of synthetic resin that allows panel members, such as for example the bumper and bumper beam of an automobile, to be fastened together without using nuts and bolts.

2. Description of the Prior Art

There are known clips of this type, such as for example the clip described by Japanese Utility Model Disclosure 61-166212, in which the clip comprises a female member and a male member, with the female member having a plurality of resilient divisions, with the end of each division pressing radially inwardly, and in which the male member has a head portion that radially outwardly flexes said divisions, a small diameter portion integrally associated to the rear of the head portion that does not radially outwardly flex the divisions, and a large diameter portion integrally associated to the rear of the small diameter portion that can engage with the ends of the divisions to thereby hold the divisions in a radially outwardly flexed state, and the small diameter portion is also provided with ribs which can be received in the dividing slits used to form the divisions in the female member.

Prior to use, such a clip is usually maintained in a provisionally assembled state, in which the male member is inserted into the female member to a point where the head portion of the male member has gone beyond the ends of the divisions and the small diameter portion is located in the cylindrical portion of the female member.

To attach a panel or other such member using the clip, the clip is inserted from the side of the panel being attached and the male member is further inserted to cause the large diameter portion of the male member to open out the divisions of the female member, thereby affixing the panel in place. The clip is arranged so that in the affixed state the ends of the divisions of the female member are held in engagement with a groove formed on the large diameter portion with the divisions outwardly flexed by the large diameter portion.

However, for the provisionally assembled state described above it is necessary that the location of the small diameter portion in the space within the divisions of the female member does not cause outward flexing of the divisions. It is for that purpose that the small diameter portion is given its small diameter, and in the prior art ribs have therefore been formed on the small diameter portion with the aim of strengthening the small diameter portion. Also, when the male member is inserted into the female member, it is positioned so that the ribs enter the slits of the cylindrical portion instead of directly abutting the divisions, which would cause the divisions to flex outward.

Thus, a drawback of the conventional arrangement is that in inserting the male member for the provisional assembly, the ribs have to be aligned so that they do not abut against the inner face of the divisions but instead enter the slits, a task which is time-consuming and requires skill to perform.

SUMMARY OF THE INVENTION

The object of the present invention is therefore to provide a clip in which the ribs are automatically located in the slits when the male member is inserted into the female member.

In accordance with the present invention, the above object is attained by a clip comprising: a cylindrical female member having a cylindrical portion and a flange extending radially outwardly from a base end of said cylindrical portion, said cylindrical portion being divided by a plurality of radially spaced-apart axial slits into a plurality of flexible divisions, said divisions each having an inward projection extending radially inwardly; and a male member for insertion in said female member, said male member having a head portion that radially outwardly flexes said divisions, a small diameter portion associated rearward of said head portion that does not radially outwardly flex said divisions, and a large diameter portion associated rearward of said small diameter portion that can engage with the inward projections of said divisions to hold said divisions radially outwardly flexed, said male member also having a plurality of ribs formed on said small diameter portion for insertion into said slits, and a cutaway portion having a guiding cam surface formed on said head portion for guiding said projections to one side of said ribs.

In the above clip, the inserted head portion of the male member advancing along the cylindrical portion of the female member radially outwardly flexes the divisions of the cylindrical portion. As the head portion thus advances, a cam surface on a cutaway portion formed on the head portion enables the projections of the divisions to be guided into position on the side of the ribs, whereby the ribs can be located in the slits by slightly rotating the male or female member. Thus, as no alignment is required the clip of this invention can be readily provisionally assembled even by a novice, greatly improving the efficiency of the operation.

Further features of the invention, its nature and various advantages will be more apparent from the accompanying drawings and following detailed description of the invention.

DETAILED DESCRIPTION OF THE INVENTION

Figure 1:
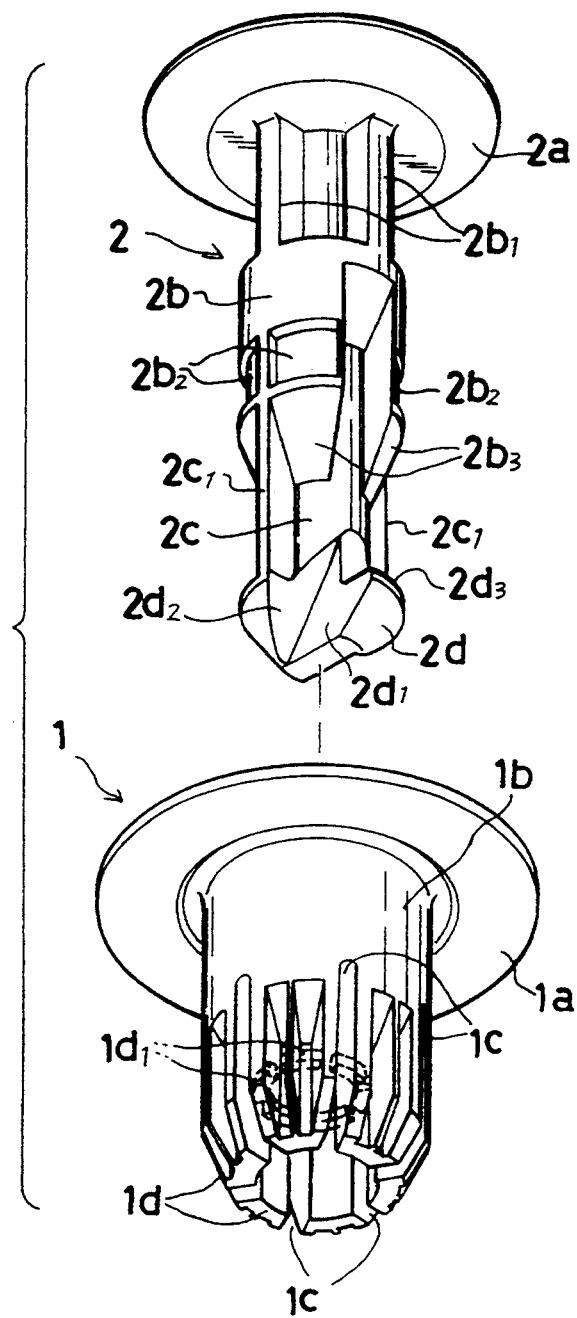
FIG. 1 is a perspective view of an embodiment of the clip of this invention, showing the male and female members in a non-assembled state.

An embodiment of the clip according to this invention will now be described with reference to the drawings.

Reference numeral 1 denotes a female member formed of synthetic resin. A base end flange 1a extends radially outwardly, from which extends a cylindrical portion 1b that is divided by slits 1c into a plurality of divisions 1d that can be outwardly flexed. Each of the divisions 1d narrows toward the end, so that the inside diameter formed by the ends is smaller than the inside diameter of the cylindrical portion 1b and smaller than the inside diameter midway along the divisions 1d. Each of the divisions 1d has a projection $1d_1$ extending radially inwardly.

Reference numeral 2 denotes a male member formed with an outside diameter that is slightly smaller than the inside diameter of the cylindrical portion $1b$ of the female member $1$. Forming an integral part of the male member $2$ are a flange $2a$ that extends radially outwardly from the base end of the male member $2$, a large diameter portion $2b$ having a plurality of raised portions $2b_1$ spaced substantially equidistantly apart around the peripheral surface of the large diameter portion $2b$, a small diameter portion $2c$, and a head portion $2d$ having substantially the same outside diameter as that of the large diameter portion $2b$.

The large diameter portion $2b$ is provided with plural recesses $2b_2$ formed around the peripheral surface of the large diameter portion $2b$ at a prescribed spacing which are capable of engaging the projections $1d_1$ formed on the inside surface of the divisions $1d$, and tapered portions $2b_3$ at the transition portion between the large diameter portion $2b$ and the small diameter portion $2c$. Provided on the peripheral surface of the small diameter portion $2c$ is a pair of diametrically opposed ribs $2c_1$ which extend lengthwise along the small diameter portion $2c$. The tip of the head portion $2d$ is conically shaped to facilitate the passage of the head portion $2d$ through the ends of the divisions $1d$. The head portion $2d$ also has a pair of cutaways $2d_1$ with a cam guide face $2d_2$ which during the insertion of the head portion $2d$ function to guide the inwardly extending projections $1d_1$ to one side of the ribs $2c_1$.

When the head portion $2d$ passes the portion with the projections $1d_1$, the cam guide face $2d_2$ guides the projections $1d_1$ so that the projections $1d_1$ are slightly deflected circumferentially toward one side of a rib $2c_1$. This is done by slightly rotating either the male member $2$ or the female member $1$, whereby the projections $1d_1$ are located on the side of a rib $2c_1$, and as a result the ribs $2c_1$ are accommodated in a slit $1c$ between adjacent ribs $2c_1$.

The clip according to the above arrangement will now be described with reference to when the clip is provisionally assembled. As the head portion $2d$ of the male member $2$ inserted into the cylindrical portion $1b$ of the female member $1$ advances, it pushes against the projections $1d_1$ and thereby flexes the divisions $1d$ radially outwardly. During this process, the cam guide face $2d_2$ of the cutaways $2d_1$ guides the projections $1d_1$ toward the side of one of the ribs $2c_1$ and by slightly rotating the male member $2$ the small diameter portion ribs $2c_1$ are guided into position in the slits $1c$. Thus, the ribs $2c_1$ are always securely guided into the proper position of accommodation in the slits $1c$, whether the male member is inserted from the start with the ribs $2c_1$ aligned with the slits $1c$ or the ribs $2c_1$ are just provisionally positioned on the inner surface of the divisions $1d$. Therefore, it does not happen that the divisions $1d$ are outwardly flexed by the abutment of the ribs $2c_1$ against the inner surface of the divisions $1d$ as the male member $2$ advances, and that this continues until the provisional assembly state is reached.

Figure 2:
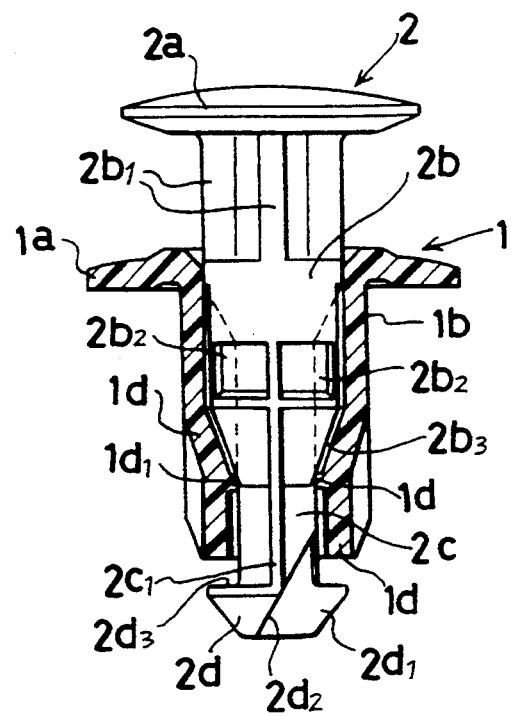
FIG. 2 is a cross-sectional view of the clip in its provisionally assembled state in which the male member is inserted partway into the female member.

When the head portion $2d$ finally passes the ends of the divisions $1d$, the resilience of the divisions $1d$ causes them to revert to the original small diameter state. In that state, the internal projections $1d_1$ on the divisions $1d$ locate on the tapered transition portions $2b_3$ between the small diameter portion $2c$ and the large diameter portion $2b$ and the ends of the divisions $1d$ are in engagement with the rear face $2d_3$ of the head portion $2d$. Thus, the male member $2$ and female member $1$ are brought into a state which does not readily permit relative freedom of movement between the two members. When at this point the inserting force is removed, the male member $2$ will be in the state of provisional insertion in the female member $1$ illustrated by FIG. 2, which is the state in which the clip is delivered for the particular assembly task concerned.

Figure 3:
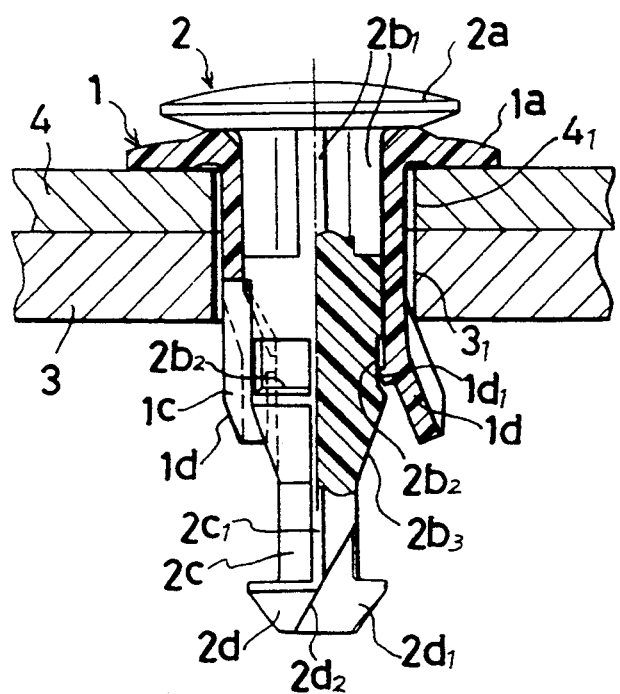
FIG. 3 is a cross-sectional view of the clip in its fully assembled state.

The method of attaching a panel or other such member to a fixed panel or the like will now be described with reference to FIG. 3. The female member $1$ of the semi-assembled clip is inserted into hole $3_1$ of a fixed panel $3$ via hole $4_1$ of the subject panel $4$ until the divisions $1d$ of the female member $1$ protrude from the hole $3_1$. By then pressing the male member $2$ into the female member $1$ until the flange $1a$ comes into contact with the flange $2a$, the divisions $1d$ are again gradually and uniformly flexed radially outwardly by the tapered portions $2b_3$ of the large diameter portion $2b$ while at the same time the head portion $2d$ and small diameter portion $2c$ project from the lower end of the divisions $1d$. With the tapered portions $2b_3$ pushed fully home, the projections $1d_1$ engage in the recesses $2b_2$ on the large diameter portion $2b$, thereby locking the male member $2$ and female member $1$ together. In this state the divisions $1d$ are flexed radially outwardly, locking the curved outer peripheral portions of the divisions $1d$ against the edge of the hole $3_1$, thereby tightly affixing the panel $4$ to the panel $3$.

In the clip of this invention, as the cutaways with the cam guide face that serve to guide to the side of the small diameter portion ribs the inward projection extending radially inwardly that is provided on each of the female member flexible divisions, are formed on the head portion of the male member, during provisional assembly the ribs can be securely located in the slits between divisions by slightly rotating the male member. This has the effect of preventing defective products caused by the male member continuing to be advanced although ribs are abutting the inner surface of divisions, producing a provisionally assembled clip in which the divisions are in an outwardly flexed state.

What is claimed is:

1. A clip fastener for fixing a fixed member to a stationary member, the clip fastener comprising:
    a cylindrical female member having a cylindrical portion and a flange extending radially outwardly from a base end of said cylindrical portion, said cylindrical portion being divided by a plurality of radially spaced-apart axial slits into a plurality of flexible divisions, said divisions each having an inward projection extending radially inwardly from a portion of said division which is midway along a length of said division; and
    a male member for insertion in said female member, said male member having a head portion that radially outwardly flexes said divisions, a small diameter portion that is associated rearward of said head portion and that does not radially outwardly flex said divisions, and a large diameter portion that is associated rearwardly of said small diameter portion and that can engage with the inward projections of said divisions to hold said divisions radially outwardly flexed, said male member also having a plurality of ribs formed on said small diameter portion for insertion into said slits, and a cutaway portion having a guiding cam surface formed on said head portion for guiding said projections to one side of said ribs and fitting said ribs into said slits.

2. A clip according to claim 1, wherein said male member has a flange extending radially outwardly from a base end of the male member.

* * * * *